Aug. 26, 1941.  A. QUOOS  2,253,866

FLOW AND TEMPERATURE REGULATOR FOR GAS BURNERS

Filed May 14, 1937  2 Sheets-Sheet 1

Inventor:
August Quoos,
By Rummler, Rummler
+ Woodworth
Attorneys.

Witness:

Aug. 26, 1941.      A. QUOOS      2,253,866
FLOW AND TEMPERATURE REGULATOR FOR GAS BURNERS
Filed May 14, 1937      2 Sheets-Sheet 2
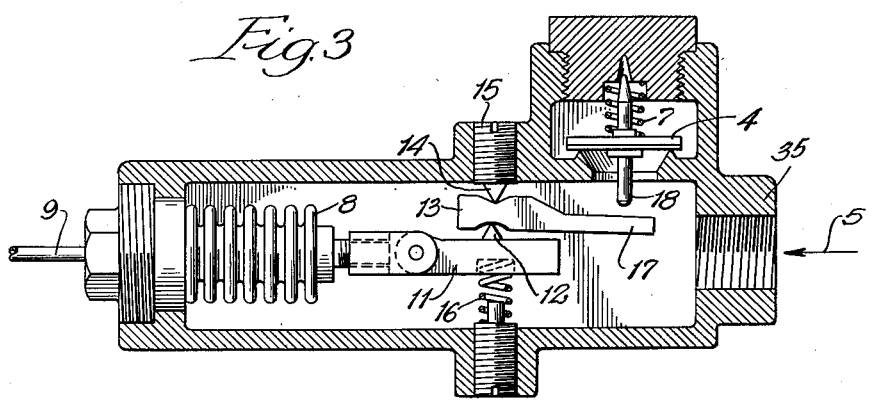
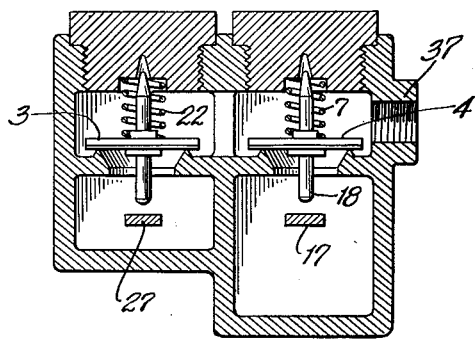
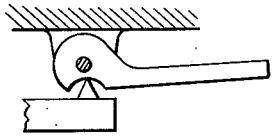
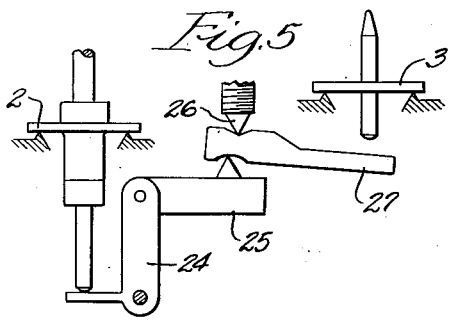
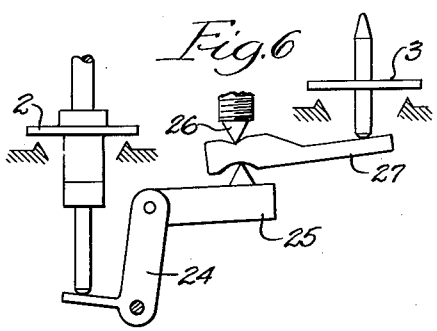

Patented Aug. 26, 1941

2,253,866

UNITED STATES PATENT OFFICE 2,253,866

FLOW AND TEMPERATURE REGULATOR FOR GAS BURNERS

August Quoos, Chicago, Ill.

Application May 14, 1937, Serial No. 142,657

10 Claims. (Cl. 236—1)

This invention relates to automatic control means for gas burners and the principal object of the invention is to improve such constructions in regard to safety and dependability in temperature regulation. One particular use for which the construction is designed is that of controlling the flow of gas to burners for air circulating heaters. The device is also useful in connection with water heaters and has other applications of that nature.

In the drawings illustrating the construction,

Fig. 3 is another vertical section taken on line 3—3 of Fig. 1.

Fig. 4 is a transverse vertical section taken on the line 4—4 of Fig. 1.

Figs. 5 and 6 are diagrams for illustrating action transmitted from one valve to another of the interconnected valves shown in Fig. 2, whereby a modulating or gradually moving regulating valve transmits motion to a quick-acting shut-off valve.

Fig. 7 shows an optional way of mounting one of the valve operating levers.

Figure 1:
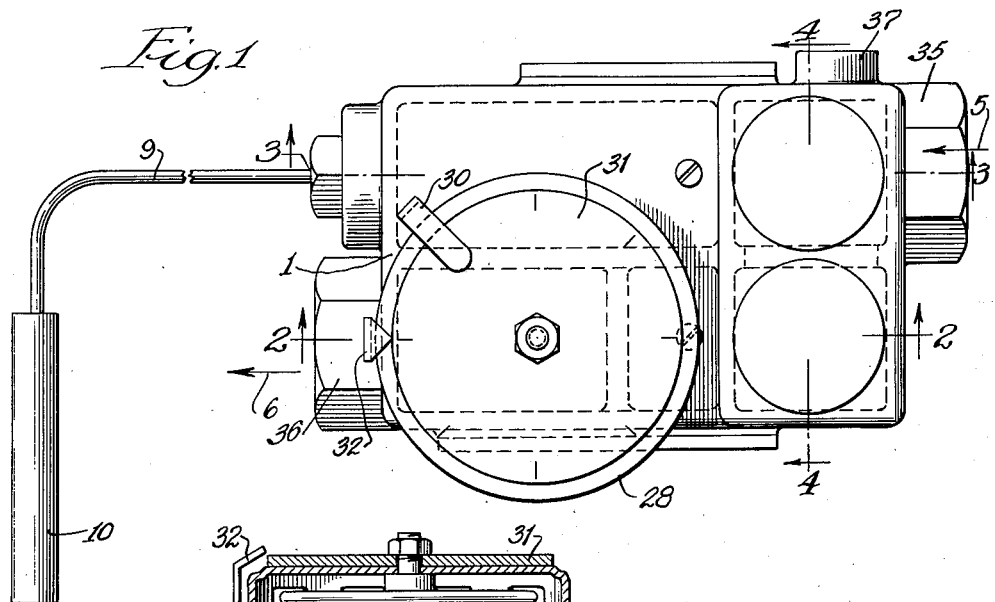
Fig. 1 is a plan view of the regulator.

In the drawings the valve housing is indicated at 1, the main or modulating valve is shown at 2, and a pair of quick-acting fuel shut-off valves at 3 and 4. Gas flow through the device is in the direction indicated by arrows 5 and 6 and passes by the valves 4, 3, and 2, in succession.

The valve housing is connected up by means of suitable threaded nipples which are provided for this purpose, and which will be briefly mentioned. The gas pipe leading from the source of supply is, for instance, connected at nipple 35, seen in Figs. 1 and 3. The nipple 35 therefore constitutes the inlet opening to the valve housing. The outlet opening is at nipple 36, Figs. 1 and 2, where the pipe extending to the main burner is attached. A small pipe for supplying gas to the pilot light is connected at nipple 37, shown in Figs. 1 and 4.

Valve 4 is held to its seat by a spring 7 unless opened from the expansion of a pilot light thermostat 8. The latter communicates through a tube 9 with an expansion fluid receptacle 10 located adjacent the pilot light. The thrust of the expansion bellows 8 is communicated to an arm 11 pivoted thereon, and having a knife edge projection 12 engaging a recess in a floating lever 13. The lever 13 is also recessed opposite the knife edge 12 where it is engaged by the knife edge 14 of screw 15. The spring 16 urges the arm 11 up and causes lever 13 to be held against its fulcrum 14.

With a cool thermostat, the end 17 of lever 13 is held away from valve stem 18. The knife edge 12 is to the left, as shown in Fig. 3, of fulcrum 14, but if sufficient heat is communicated to the expansion bellows 8, arm 11 moves to the right and the knife edge 12 passes center with reference to fulcrum 14 and end 17 of lever 13 rocks up and instantly fully unseats valve 4. Valve 4 remains unseated at all times under normal operating conditions, or while the pilot light is burning.

If the pilot light should accidentally become extinguished, the thermostat 8 will cool off and the valve 4 will shortly assume its closed position, as shown in the drawings. The closing of valve 4 stops the flow of gas to both the main burner and the pilot light. The pilot light cannot be restarted therefore without first opening valve 4, which can be accomplished by applying heat to the bulb 10. This may be readily done by using a lighted match. As soon as the valve 4 opens, gas is supplied to the pilot light, which can then be started up. The pilot light now supplies heat directly to the bulb 10 and keeps valve 4 open.

While valve 4 is open the supply of gas to the main burner is controlled by valves 2 and 3. The former is a variable flow valve controlled by the spring 19 and the expansion bellows 20. Valve 3 is a shut-off valve which is controlled by valve 2 in a manner which will be described shortly.

Figure 2:
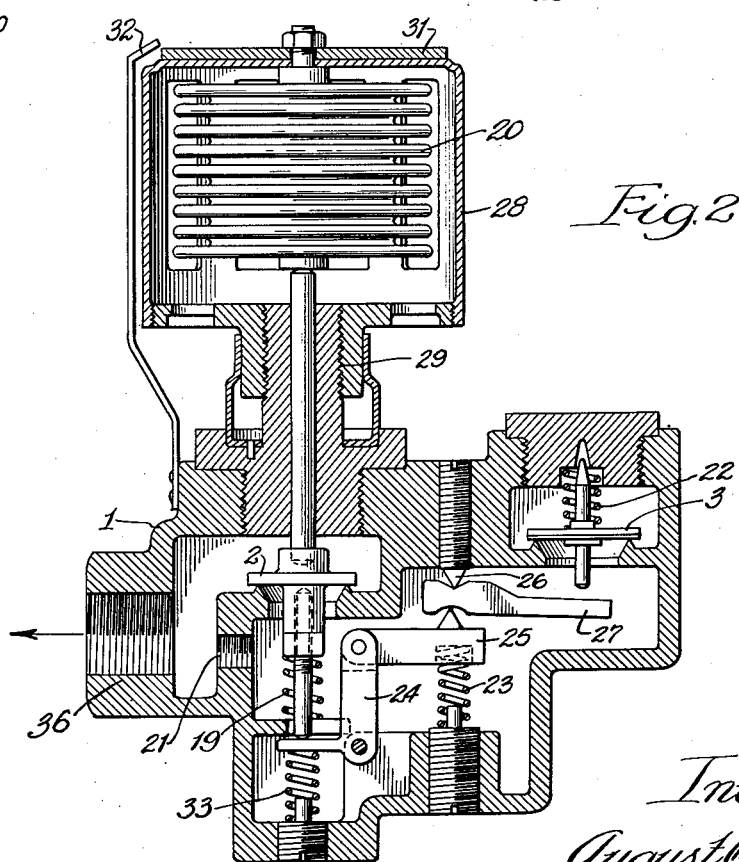
Fig. 2 is a vertical section taken on the line 2—2 of Fig. 1.

An important feature of this gas flow regulator is a minimum flow orifice indicated at 21, Fig. 2, which is threaded to receive orifice elements with apertures of different sizes. Thus, when valve 2 so closely approaches its seat as to endanger continued combustion in the absence of the minimum flow orifice, this orifice corrects that condition. The valve 2 is free to be fully seated upon excessive expansion of bellows 20, but before arriving at its seated position its downward motion insures complete stoppage of gas flow, either through the port of this valve or through orifice 21, by causing the instant seating of valve 3.

The mechanism for communicating motion from valve 2 to valve 3, as shown in Fig. 2, is similar to that described in connection with valve 4 in Fig. 3. Valve 3 is urged to its seat by spring 22 but is lifted from its seat upon a sufficient opening of valve 2 by the action of springs 33 and 23. Upward movement of valve 2 allows spring 33 to rock bell crank lever 24 to the right and to shift the knife edge arm 25, pivoted thereto, to the right past the center line of pivot screw 26 for a valve operating lever 27. The right hand end of this lever is in that manner snapped upwardly against the stem of valve 3 and is held in that position by spring 23. That is the normal position of valve 3; but if thermostat 20 is subject to a temperature higher than the normal working range, a reverse motion of bell crank 24 takes place and valve 3 closes.

The temperature responsive bellows 20 is subject to the temperature of the heated medium and is, therefore, supported in an open cage 28. Cage 28 is adjustable on a threaded post 29 for the purpose of raising or lowering the operating range of the thermostat. The limits of rotation of the case and thermostatic bellows are determined by a stop 30 carried by a disc 31 secured to the cage. This stop cooperates with a fixed stop or pointer 32.

The disc 31 is a dial having temperature markings thereon and the initial reading of dial 31, with reference to the pointer 32, is made to correspond with the expanded condition of bellows 20 according to its surrounding temperature by rotating the dial, with reference to the cage, and then clamping it to the cage. Later adjustments effected by rotating the cage and bellows as a unit on post 29 serve to raise or lower the temperature operating range of valve 2. Upon contraction of the bellows 20, valve 2 follows it under the action of spring 19.

In the operation of this device, all three valves are normally unseated and the only change that takes place is a gradual one of the temperature-modulating valve 2, without effect on the leverage system between it and valve 3. As the temperature of the heated medium rises, valve 2 moves toward its seat and thus reduces the gas flow and as the temperature of the heated medium decreases, valve 2 moves further away from its seat.

If an excessive rise of temperature occurs, valve 2 becomes seated but just before making contact with the seat, downward motion of the valve results in the swinging of bell crank lever 24, the slight distance which is required to release valve 3. The latter entirely shuts off the gas supply to the main burner. The valve 3 has a snap action which takes place because of the rapidity of motion of the lever 27 when its lower fulcrum passes the dead center position.

When the gas is shut off the main burner is extinguished, whereupon the condition of excessive temperature becomes corrected. The fall in temperature is followed by contraction of bellows 20, and as soon as the temperature reaches a point where heat is required the valve 2 will have been raised far enough to bring about the opening of valve 3. Gas is thus again supplied to the main burner, which automatically starts from the pilot light. The latter, of course, remains lighted while valve 3 is closed.

The performance required, for this fuel feed regulator to meet various possible contingencies in the burner action, is to insure a controlled operation of the burner when any gas at all passes through the regulator; to effect a shut-off of gas to the burner if the heat from the burner exceeds a predetermined maximum, and to effect a complete shut-off of gas when there is a loss of heat at the pilot light.

To attain the results above-mentioned, a combination of features is essential and such combination includes: a differential valve operative according to the temperature of the heated medium, a minimum flow by-pass around the valve of the regulator so as to prevent the fuel mixture becoming so lean as to be likely to puff out or become an explosive mixture; a shut-off valve under the control of the differential valve for the purpose of entirely stopping the flow of gas to the burner; and a separate, quick-acting shut-off valve having independent thermostatic operating means subject to the heat of the pilot light.

A constructional detail, assumed to be novel, is that of a horizontally movable knife-edge element arranged for producing a quick action of a valve-operating lever, as the knife edge element passes dead center position with reference to an opposing fulcrum, and allows a spring to become effective for actuating the valve-operated lever.

Although a certain specific embodiment of the invention has been described herein, suited to a particular application thereof, it will be understood that modifications may be made within the operating principles of the invention; and I do not therefore desire to be limited to the exact embodiment which has been shown and described, but desire to include and have protected by Letters Patent all forms and modifications of my invention which come within the scope of the appended claims.

I claim:

1. In a construction of the class described, a hollow body having inlet and outlet apertures, an automatic shut-off valve mounted in said body for controlling flow therethrough, means for operating said valve including a lever, a fulcrum support for said lever, said lever having a concave surface opposite said fulcrum support, an element having a knife edge for engaging the concave surface of said lever, means for shifting said element laterally across the dead center axis of the fulcrum and knife edge, and spring means for effecting a quick throw of the lever when the dead center position is passed.

2. In a construction of the class described, a hollow body having inlet and outlet apertures, an automatic shut-off valve mounted in said body for controlling flow therethrough, means for operating said valve including a lever, a fulcrum support of said lever, said lever having a concave surface opposite said fulcrum support, an element having a knife edge for engaging the concave surface of said lever, means for shifting said element laterally across the dead center axis of the fulcrum and knife edge, spring means for effecting a quick throw of the lever when the dead center position is passed, and a movable regulating valve having connections with said element for actuating said element.

3. In a construction of the class described, a hollow body having inlet and outlet apertures, an automatic shut-off valve mounted in said body for controlling flow therethrough, means for operating said valve including a lever, a fulcrum support for said lever, said lever having a concave surface opposite said fulcrum support, an element having a knife edge for engaging the concave surface of said lever, means for shifting said element laterally across the dead center axis of the fulcrum and knife edge, spring means for effecting a quick throw of the lever when the dead center position is passed, and thermostatically operated means for actuating said element.

4. Apparatus for controlling the flow of fuel gas to a burner, said apparatus comprising a casing having inlet and outlet ports whereby said casing may be connected in the main gas supply pipe leading to said burner, two serially related gas supply valves in said casing directly controlling the flow of gas between said ports and to said burner, thermostatic means for gradually closing a first one of said valves while the second valve is open, a valve stem for said first valve, a by-pass around said first valve to limit the effect thereof in reducing the gas flow while closing, a snap-acting mechanism having a pivoted lever with one end interposed in the path of movement of said valve stem, a second pivoted lever for operating said second valve, and means connected to said first lever forming a slidable pivot for said second lever whereby said second valve is closed prior to the complete closing of said first valve responsive to the closing operation of said first valve to a predetermined extent.

5. Apparatus for controlling the flow of fuel gas to a burner equipped with a pilot light, said apparatus including a regulating valve and two shut-off valves, means for supplying gas to said burner through all three valves in series, means responsive to the temperature of the medium heated by said burner for controlling said regulating valve, means operated by said regulating valve upon approaching closed position for closing the second shut-off valve, said last means including a dead center device and a lever acting on the stem of the second valve, means for supplying gas to said pilot light through the first shut-off valve only, and means for closing the first shut-off valve if said pilot light goes out.

6. In a fuel gas regulator, a casing having inlet and outlet ports, two serially related valves in said casing controlling the flow of gas between said ports, one of said valves being closed when no gas is required, thermostatic means for gradually opening the other valve while the first valve remains closed to prevent any flow of gas through either valve, and means responsive to a predetermined opening of the second valve for suddenly opening the first valve, said last means including a pivoted lever, a spring pressed member bearing against said lever at one side of the pivot point, and means controlled by the second valve for moving said member to cause it to bear against said lever at the other side of the pivot point.

7. In a fuel gas regulator, a valve, a spring and thermostat cooperating to control the position of said valve, a lever operated by the valve stem, a snap acting device actuated by said lever, a shut-off valve operated by said snap acting device, and a conduit for conducting gas to a burner through both said valves in series.

8. In a fuel gas regulator, a casing having inlet and outlet ports, a compartment in the casing, a shutoff valve for controlling the flow of gas from the inlet port to said compartment, said valve being so arranged that the gas pressure on the inlet side of the valve tends to maintain it in closed position, a regulating valve for directly controlling the flow of the gas from said compartment to a burner via said outlet port, and means in said compartment responsive to an opening movement of said regulating valve past a predetermined critical point for suddenly opening said shutoff valve, said last named means comprising an operating member connected to said regulating valve, a pivoted lever with one end interposed in the path of said operating member, a second pivoted lever for operating said shutoff valve, and a pivot which is axially slidable on said second lever connected to said first lever.

9. In a fuel gas regulator, a casing having inlet and outlet ports, a shutoff valve and a regulating valve thru which the gas flows in series from the inlet port to the outlet port, a pivoted lever having two positions for controlling the opening and closing of said shutoff valve, a spring pressed movable member bearing on said lever at one side or the other of its pivot for causing the same to pass suddenly from one position to the other, and means controlled in accordance with the movement of said regulating valve for shifting the bearing of said movable member axially of said lever to actuate the same as set forth.

10. In a fuel gas regulator, a casing having two generally parallel compartments extending lengthwise thereof, an inlet port opening into a first one of said compartments, a passage extending transversely across both compartments, a valve controlling the flow of gas from said first compartment to said passage, mechanism in said first compartment for effecting sudden opening and closing of said valve, a second valve for controlling flow of gas fram said passage to said second compartment, an outlet port, a regulator valve for controlling flow of gas from said second compartment to said outlet port, and mechanism in said second compartment for effecting sudden opening and closing of said second valve in timed relation to the movement of said regulating valve.

AUGUST QUOOS.